United States Patent [19]

Eiermann et al.

[11] 4,245,502
[45] Jan. 20, 1981

[54] APPARATUS FOR MEASURING THE VELOCITY OF GASES

[75] Inventors: Kurt Eiermann, Pfungstadt, Fed. Rep. of Germany; Franz Kolb, deceased, late of Hanau, Fed. Rep. of Germany, by Elizabeth Kolb, executrix

[73] Assignee: Deutsche Gold- und Silber-Scheideanstalt vormals Roessler, Frankfurt am Main, Fed. Rep. of Germany

[21] Appl. No.: 8,572

[22] Filed: Feb. 1, 1979

[30] Foreign Application Priority Data

Apr. 2, 1978 [DE] Fed. Rep. of Germany ....... 2804850

[51] Int. Cl.³ ............................................. G01F 1/68
[52] U.S. Cl. ................................................ 73/204
[58] Field of Search .................................... 73/204

[56] References Cited

U.S. PATENT DOCUMENTS

| 2,870,305 | 1/1959 | Ling ...................... 73/204 |
| 3,677,085 | 7/1972 | Hayakawa ............. 73/204 |
| 3,900,819 | 8/1975 | Djorup .................. 73/204 |
| 4,024,761 | 5/1977 | Djorup .................. 73/204 |
| 4,074,566 | 2/1978 | Obayashi ............... 73/204 |

FOREIGN PATENT DOCUMENTS

| 2649040 | 3/1978 | Fed. Rep. of Germany . |
| 2728060 | 1/1979 | Fed. Rep. of Germany ........... 73/204 |

OTHER PUBLICATIONS

Olin "Split–Film Anemometers Sensor" in Instruments and Control Systems 6/70.

*Primary Examiner*—Herbert Goldstein
*Attorney, Agent, or Firm*—Cushman, Darby & Cushman

[57] ABSTRACT

There is provided an apparatus for the measurement of the velocity of gases, especially for the intake of internal combustion engines, consisting essentially of an electronic unit and a hot-wire anemometer, with two or more temperature dependent resistance with the highest possible temperature coefficients which together with two resistances are connected to form a bridge. The temperature dependent resistances are made of a thin metal coating which are placed on electrically insulating carriers.

13 Claims, 10 Drawing Figures

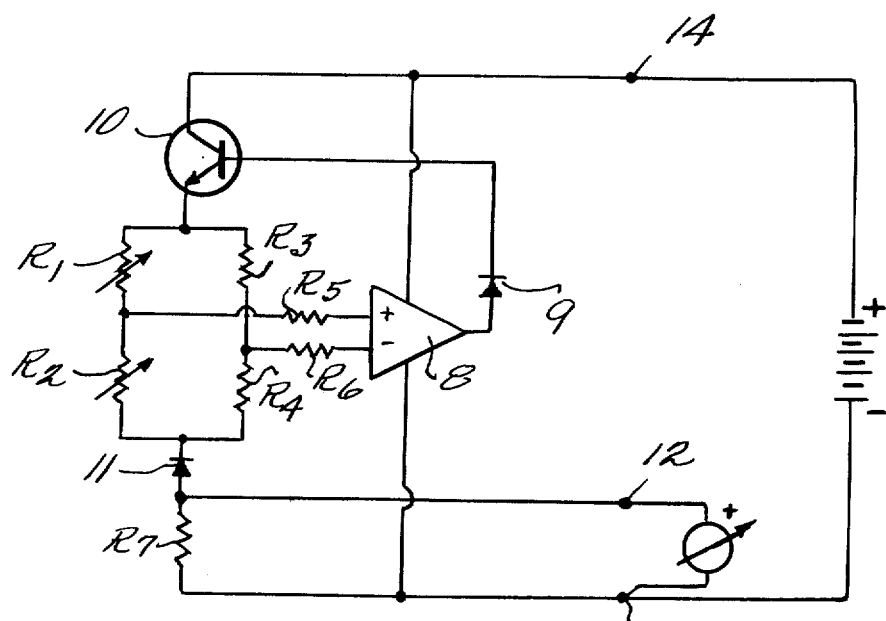
Fig. 1 PRIOR ART
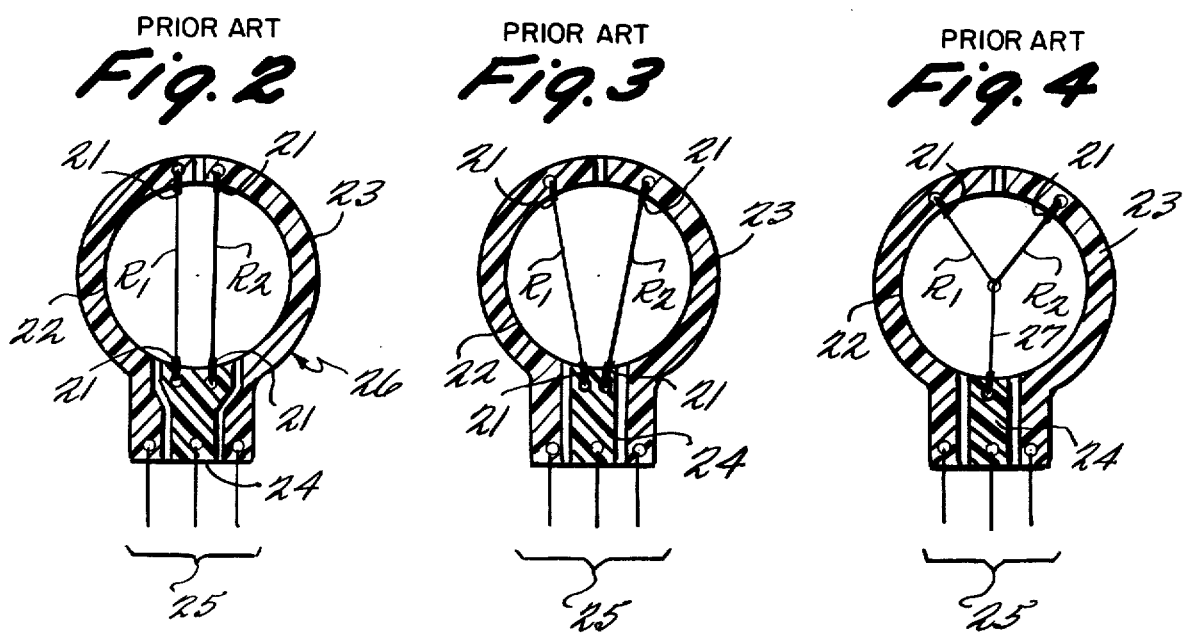
PRIOR ART
Fig. 2
PRIOR ART
Fig. 3
PRIOR ART
Fig. 4

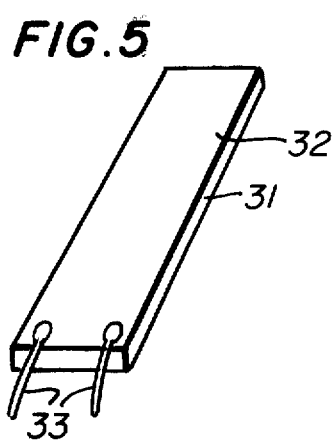
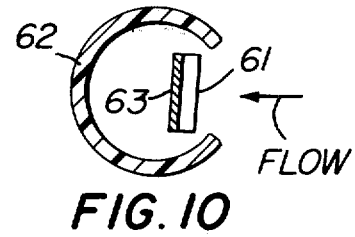
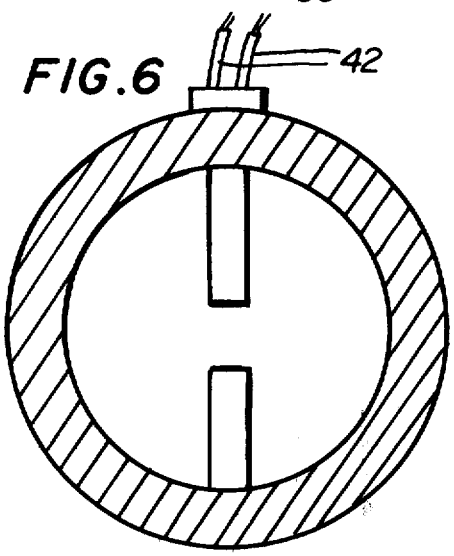
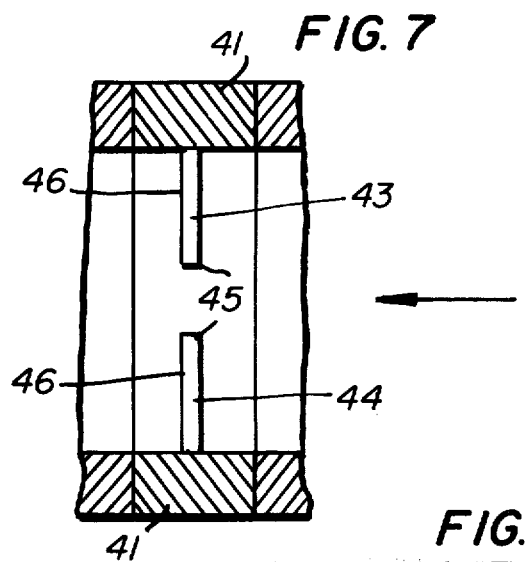
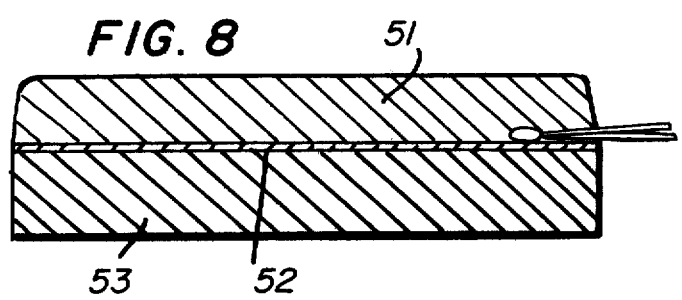
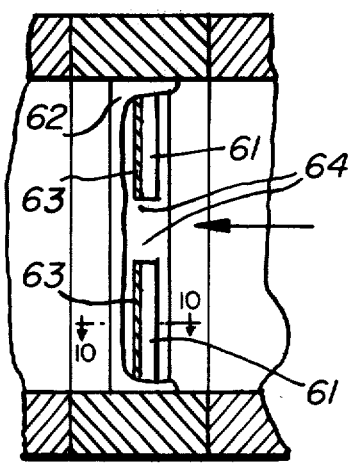

APPARATUS FOR MEASURING THE VELOCITY OF GASES

BACKGROUND OF THE INVENTION

The invention is directed to an apparatus for measuring the velocities of gases, especially for the measurement of air for internal combustion engines, consisting essentially of a hot-wire anemometer as a measuring probe placed in the medium to be measured and an electronic unit, wherein the hot-wire anemometer is stablized against drift of the probe characteristics.

In the interest of maintaining the purity of the air it is necessary to reduce the emission of noxious materials from internal combustion engines, particularly from automobiles. This object is, among others, obtained by an improvement of the combustion process. For this it is necessary that there be available the most exact information of the amounts of air taken in, that is with the smallest possible time delay.

This information together with other information such as speed and motor temperature is fed to an electronic control unit which ascertains the necessary amount of fuel for optimum combustion and the time of its addition and is led futher to an appropriate regulating unit.

It has already been proposed to employ for this purpose flow measuring apparatuses in the form of orifices or venturi nozzles with appropriate pressure differential measuring instruments. However, in both cases it is difficult to obtain from the slight pressure differential in a simple manner an electrical starting signal to control the fuel.

Furthermore, it is already known to employ measuring instruments for measuring velocity in which an object located in the airstream changes its position. Thereby there is applied an increasing counterforce with an increasing deflection so that the object for any specific velocity is located at a fixed position.

The position of the object can now be scanned optically or mechanically and the results of this scanning changed into an electrical signal. In this process the scanning and above all the long reaction time caused thereby is disadvantageous.

There have also been used devices in which a propeller located in the airstream is scanned optically, mechanically or electrically (magnetically). Also in these cases the moment of inertia of the propeller causes a considerable delay in the reaction time.

Also there are known hot-wire anemometers of different construction in which two temperature dependent resistances, for the most part in the form of two wires, are connected in a bridge together with two temperature independent resistances. One temperature dependent resistance is only exposed to the flow of the gas to be measured and the other only to the temperature of the gas. A disadvantage thereby is that the resistance measuring the temperature of the gas must be shielded from the gas flow. In spite of this the measurement of the flow in this device is still temperature dependent to a certain extent.

To avoid these disadvantages it has already been proposed by one of us (Kolb) to use a hot-wire anemometer which contains two resistance wires of different diameter from the same material with the highest possible temperature coefficients, which together with two temperature independent resistances are connected together to form a bridge and are connected with the input of a difference amplifier whose output is coupled with the bridge input.

The output voltage of this bridge circuit is conducted to an amplifier whose output signal controls the bridge supply current. This apparatus has the advantage that it permits quick and accurate measurement of the velocity of flow of gases independent from the temperature of the gases, whereby the measured result can be easily changed into an electrical output signal.

In Kolb the two resistances of different diameter, for example, are made of wires of platinum, nickel, iron or tungsten, preferably in wound form. The ends of the wires are reinforced advantageously with a good conducting material such as silver or copper. The thin wire preferably has a thickness of 20-150 microns and the thick wire a thickness of 50-250 microns.

FIGS. 1-4 hereof are copies of the drawing Figures of Kolb, U.S. Pat. application Ser. No. 839,383, filed Oct. 4, 1977, now abandoned and accordingly are marked PRIOR ART.

In FIG. 1, there is shown the measuring apparatus of Kolb. R1 and R2 are the two measuring wires of the probe which are exposed to the airstream to be measured. They are disclosed to have thicknesses of 20-150$\mu$, and 50-250$\mu$, respectively, with R2 always being thicker than R1. R3 and R4 form a fixed voltage divider. The bridge diagonal voltage is supplied via the limiting resistors R5 and R6 of a differential amplifier 8. The output of the differential amplifier 8 via the decoupling diode 9 controls the transistor 10. This transistor 10 regulates the bridge supply current which flow for the most part over the resistances R1 and R2 and only a very small part flows over the substantially high ohmic resistances of the voltage divider R3 and R4. The Zener diode 11 insures that the inverting and non-inverting input of the voltages of the differential amplifier 8 do not go below a fixed minimum height. At resistance R5 the current flowing through the measuring bridge produces a drop in voltage which can be provided at terminals 12 and 13 as output voltages. The operational voltage is supplied between terminals 14 and 13.

In FIGS. 2, 3 and 4, R1 is the thinner measuring wire and R2 the thicker measuring wire, both of which with their reinforced ends 21 are mechanically connected with the electrically conducting parts, 22, 23 and 24 of the carrier body 26. In FIG. 2 the resistances R1 and R2 are arranged parallel, in FIG. 3 in V form and in FIG. 4 in Y form whereby the low part 27 of the Y is formed to R1 and R2 through the necessary supply leads. The connection to the electronic unit takes place via feed lines 25.

The operation of the Kolb device can be explained as follows:

The voltage divider R3 and R4 is so dimensioned that at a flow velocity of $v=0$ a feed current flows through the resistances R1 and R2. The resistance R1 as a result is more strongly heated up than the thicker wire consisting of resistance R2. The feed current adjusts itself automatically so that the bridge is in equilibrium, i.e., R1:R2=R3:R4. At R5 as a result there is found a specific drop in voltage.

If now the resistances R1 and R2 are impacted with flowing air, the hotter resistance R1 cools more quickly than the colder resistance R2, the bridge falls out of equilibrium and the differential amplifier 8 produces a higher output current which controls the transistor 10 to increase the current which is flowing into the bridge such that the ratio R1:R2-R3:R4 is again produced. At R5 there is now a higher voltage drop.

According to Kolb, temperature changes of the air measured have no influence on the measuring result since both resistances R1 and R2 have the same temperature coefficient and the bridge equilibrium is not disturbed thereby.

According to Kolb, his device exhibits the particular advantage that the output voltage (terminals 12 and 13) within very wide limits is independent of the applied operational voltage between the terminals 14 and 13. This device according to Kolb holds the current necessary for the bridge equilibrium automatically constant, independent of the at times applied operating voltage so long as the applied supply voltage is sufficiently great to cover the voltage drop at the resistance R5, at the diode 11, the resistances R1 and R2 and the lowest voltage drop at the transistor 10.

At high air flow velocities a very strong current flows through the resistance R1. If the resistance R1 is extended as a simple wire section over the entire cross-section of the air flow, there can be in the sections of the wire nearest the wall an overheating of the resistance R1 at such places caused by the much slower or almost non-moving air layers. To avoid this it is advantageous according to Kolb to reinforce the ends of both resistances R1 and R2 in the area of the slower flowing air layers near the wall and thus to substantially reduce their resistance and their effectiveness in this area, or to entirely eliminate it. This precaution, Kolb discloses, has the additional advantage that the dirty course of flow of the air layers near the wall does not influence the measurement.

However, in practice it has proven that the characteristic of this anemometer probe is not stable, but in the course of time shows deviations from the calibrated characteristic. This drift above all is traced to the deposition of dust on the wire surfaces which changes the heat transmission and additionally is traced to erosion and deformation of the surfaces of the measuring wire by rebounding dust particles contained in the gas stream.

Besides such a hot-wire anemometer has the property of detecting the amount of the velocity of flow independent of the direction of flow. In many cases of use, e.g. even in the intake system of internal combustion engines, the velocity of flow is interfered with by temporary fluctuations. These fluctuations can be so great that they can temporarily reverse the direction of flow. In such cases such a hot-wire anemometer shows a false average value.

SUMMARY OF THE INVENTION

Therefore it was the problem of the present invention to create an apparatus for the measurement of the velocity of flow of gases, especially the intake air of internal combustion engines, consisting essentially of an electronic unit and a hot-wire anemometer with two or more temperature dependent resistances which together with two temperature independent resistances are connected to form a bridge, in which the probe characteristic in the course of time drifts away from the regulated calibration as little as possible and which indicates a correct average value in strongly fluctuating velocities of flow.

This problem was solved according to the invention by making the temperature dependent resistances respectively always of respective thin metal layer which are applied on electrically insulating carriers.

The device of the invention can consist essentially of or consist of the stated parts.

BRIEF DESCRIPTION OF THE DRAWINGS

The invention will be understood best in connection with the drawings wherein:

FIG. 1 is a schematic representation of the PRIOR ART measuring device of Kolb:

FIGS. 2-4 are sectional views of three respective forms of the measuring probe of the PRIOR ART measuring device of Kolb.

FIG. 5 schematically illustrates a temperature dependent resistance according to the invention;

FIG. 6 is a longitudinal section of a probe according to the invention;

FIG. 7 is a cross section of the probe of FIG. 6;

FIG. 8 is a section view of a fixed resistance; and

FIG. 9 illustrates another form of the invention partially broken away and in section.

FIG. 10 is a fragmentary transverse cross-sectional view on line 10—10 of FIG. 9.

DESCRIPTION OF THE PREFERRED EMBODIMENTS

Referring more specifically to FIG. 5 of the drawings there is shown schematically a temperature dependent resistance according to the invention consisting of an electrically insulating carrier 31 and a thin metal layer 32 which is connected via connectors 33 with the bridge circuit (e.g., as shown in FIG. 1). The metal layer 2 for example has a thickness of 0.5 to 10 microns.

The resistance layer is advantageously provided with a protective coating. Thereby there is excluded the depositing of dust or other foreign material directly on the metal layer and there is excluded the erosion of the metal layer through rebounding foreign particles. This protective layer, however, is not necessary in all cases of use.

To prevent the deposition of dust from influencing the measuring element on the characteristic of the probe, it is frequently advantageous to protect the metal layer against the flowing medium through a layer of electrically insulating material exactly defined and reproducible in dimensions and thermal properties. This requirement is preferably fulfilled by so arranging the temperature dependent resistances in the probe that the metal layer is located on the flow diverted side and the carrier is located on the flow side. FIG. 6 in longitudinal section and FIG. 7 in cross section schematically illustrate such an apparatus. In a two sided open housing 41 there are placed in electrically insulated manner two resistances 43 and 44 provided with service lines 42 whereby the electrically insulating carrier 45 is turned to the flow side while the metal layer 46 is on the side turned away from to the flow. The electrically insulating layer 45 arranged turned to the direction of flow in measuring elements of this type always has a very exactly defined thickness and very uniform material properties and therewith fulfills the stated requirements. Of course it is also possible to place the resistances 43 and 44 with the metal layer to the flow side.

It is often advantageous to avoid the detection of flow components which are directed against the main direction of flow. This can be attained if the protection layer on the side turned away from the direction of flow imparts a substantially stronger heat insulation than is possessed by the electrically insulating layer. This is preferably solved by making the protective layer 51 which covers the metal layer 52 on the carrier 53 of a poor heat conducting material and by making it relatively thick as shown in FIG. 8. In another form of the invention there is placed over the side of the resistance 61 turned away from the flow a housing 62 in which way there remains an air space 64 between the protective layer 63 of the resistance 61 and the inner wall of the housing 62 as shown in FIG. 9.

As materials for the electrically insulating carriers there have proven to be of special value ceramic materials, as, e.g., Al$_2$O$_3$, MgO, ZrO$_2$ or metallic materials with an insulating intermediate layer of, e.g., Al$_2$O$_3$. There also can be used synthetic resin carriers, as, e.g., fiber reinforced printed wire bound materials. For the temperature sensitive measuring layer there can be used metals which are known from resistance thermometry such as, e.g., Pt, Cu, Ni or appropriate alloys which in the operating temperature range undergo a continuous and reproducible change of the specific resistance over the temperature. For the protective layer there are particularly approved organic compounds such as synthetic resins, inorganic cements, especially silicon rubber or glazes in a given case with organic binders. For the housing there can be used either metals or temperature resistant synthetic resins.

What is claimed is:

1. In an apparatus for the measurement of the velocity of flow of a gas in a gas stream, in which:
   a hot wire anemometer is provided, which includes:
      two temperature-dependent electrical resistance members and two temperature-independent resistance members, the two temperature-dependent resistance members being adapted to be disposed in said gas stream,
      means electrically connecting the four resistance members in a measuring bridge,
      the electrical resistances characteristic of the four resistance members being such that when a bridge supply current is provided to the measuring bridge, a majority flows over the two temperature-dependent resistance members and a smaller remainder flows over the two temperature-independent resistance members, which are provided with substantially higher ohmic resistances than the two temperature-dependent resistance members and together function in the measuring bridge as a voltage divider, and
      the two temperature-dependent resistance members being characterized by having large temperature coefficients, the improvement wherein:
   each temperature-dependent resistance member comprises:
      an electrically insulating carrier having a flow-facing side and an opposite flow-diverted side;
      a thin layer of electrically conductive metal positioned at least for the most part on only the flow-diverted side of said electrically insulating carrier; and
      connector means for electrically connecting the thin layer of electrically conductive metal into said measuring bridge.

2. The improved apparatus of claim 1, further including:
   on each temperature-dependent resistance member, a protective coating on the thin metal layer, for preventing erosion of the thin metal layer when particles in the gas stream impact that temperature-dependent resistance member.

3. The improved apparatus of claim 2, further including:
   a respective housing spacedly but only partially enclosing each temperature-dependent resistance member, in a manner such that when that temperature-dependent resistance mamber is disposed in a gas stream, said flow-facing side thereof is exposed to the gas stream and said thin layer of metal on said flow-divered side is spacedly enclosed by the respective said housing;
   said housing having a thermal insulating effect on the respective said thin layer of metal which is a multiple of the thermal effect on said thin layer of metal which results from interposition of said electrically insulating carrier between the gas stream flow and said thin layer of metal covered by said protective coating.

4. The improved apparatus of claim 2, wherein:
   the protective coating provides a substantial thermal insulating effect for the respective said thin layer of metal.

5. The improved apparatus of claim 1, further including:
   a respective housing spacedly but only partially enclosing each temperature-dependent resistance member, in a manner such that when that temperature-dependent resistance member is disposed in a gas stream, said flow-facing side there of is exposed to the gas stream and said thin layer of metal on said flow-diverted side is spacedly enclosed by the respective said housing;
   said housing having a thermal insulating effect on the respective said thin layer of metal which is a multiple of the thermal effect on said thin layer of metal which results from interposition of said electrically insulating carrier between the gas stream flow and said thin layer of metal.

6. The improved apparatus of claim 2, wherein:
   the protective layer is made of a poor heat conductor provided by a relatively thick layer of synthetic resin.

7. The improved apparatus of claim 6, wherein:
   the synthetic resin is essentially composed of silicon rubber.

8. The improved apparatus of claim 2, wherein:
   the protective layer is made of a poor heat conductor provided by a relatively thick layer of an inorganic cement.

9. The improved apparatus of claim 2, wherein:
   the protective layer is made of a poor heat conductor provided by a relatively thick layer of an inorganic glaze.

10. The improved apparatus of claim 1, further comprising:
    a conduit through which a flow intake air of an internal combustion air is passing as said flow of said gas stream,
    said temperature-dependent resistance members being mounted in said conduit so as to project into said flow of intake air.

11. The improved apparatus of claim 2, further comprising:
    a conduit through which a flow intake air of an internal combustion air is passing as said flow of said gas stream, said temperature-dependent resistance members being mounted in said conduit so as to project into said flow of intake air.

12. The improved apparatus of claim 3, further comprising:

a conduit through which a flow intake air of an internal combustion air is passing as said flow of said gas stream, said temperature-dependent resistance members being mounted in said conduit so as to project into said flow of intake air.

13. The improved apparatus of claim 4, further comprising:

a conduit through which a flow intake air of an internal combustion air is passing as said flow of said gas stream, said temperature-dependent resistance members being mounted in said conduit so as to project into said flow of intake air.

* * * * *